United States Patent
Li et al.

(10) Patent No.: US 11,240,740 B2
(45) Date of Patent: Feb. 1, 2022

(54) METHOD FOR PROCESSING RADIO FREQUENCY RESOURCES AND TERMINAL

(71) Applicant: Huawei Technologies Co., Ltd., Shenzhen (CN)

(72) Inventors: Zhongjin Li, Xi'an (CN); Fuke Wang, Shenzhen (CN); Lei Wang, Xi'an (CN); Wenjie Duan, Xi'an (CN); Li Shen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/651,527

(22) PCT Filed: Sep. 29, 2017

(86) PCT No.: PCT/CN2017/104428
§ 371 (c)(1),
(2) Date: Mar. 27, 2020

(87) PCT Pub. No.: WO2019/061309
PCT Pub. Date: Apr. 4, 2019

(65) Prior Publication Data
US 2020/0374785 A1 Nov. 26, 2020

(51) Int. Cl.
*H04W 48/16* (2009.01)
*H04W 8/18* (2009.01)
*H04W 8/24* (2009.01)
*H04W 24/02* (2009.01)
*H04W 60/00* (2009.01)

(52) U.S. Cl.
CPC .......... *H04W 48/16* (2013.01); *H04W 8/183* (2013.01); *H04W 8/24* (2013.01); *H04W 24/02* (2013.01); *H04W 60/005* (2013.01)

(58) Field of Classification Search
CPC ....... H04W 48/16; H04W 8/24; H04W 8/183; H04W 24/02; H04W 60/005
See application file for complete search history.

(56) References Cited

U.S. PATENT DOCUMENTS

| 2009/0156257 A1 | 6/2009 | Shi |
| 2013/0044609 A1 | 2/2013 | Chen et al. |
| 2014/0146667 A1 | 5/2014 | Zhang et al. |

(Continued)

FOREIGN PATENT DOCUMENTS

| CN | 101203005 A | 6/2008 |
| CN | 102244941 A | 11/2011 |

(Continued)

*Primary Examiner* — Wayne H Cai
(74) *Attorney, Agent, or Firm* — Conley Rose, P.C.

(57) ABSTRACT

A method related to the field of mobile communications technologies and for processing radio frequency resources includes detecting, by a terminal, a service mode of a first service that uses a primary subscriber identification module (SIM) card, where the service mode includes a real-time service mode and a non-real-time service mode, and reducing, by the terminal, a proportion of radio frequency (RF) resources occupied by a secondary SIM card when the service mode of the first service is the real-time service mode, where the primary SIM card is a card for performing the real-time service mode, and the secondary SIM card is a card, other than the primary SIM card, in a multi-SIM multi-standby terminal.

20 Claims, 4 Drawing Sheets

(56) References Cited

U.S. PATENT DOCUMENTS

| | | | |
|---|---|---|---|
| 2014/0241237 A1 | 8/2014 | Speight et al. | |
| 2014/0248922 A1 | 9/2014 | Josso et al. | |
| 2015/0296520 A1* | 10/2015 | Batchu | H04W 72/02 |
| | | | 455/434 |
| 2015/0304989 A1 | 10/2015 | Zhu et al. | |
| 2018/0124868 A1* | 5/2018 | Gupta | H04W 24/10 |

FOREIGN PATENT DOCUMENTS

| | | |
|---|---|---|
| CN | 102907130 A | 1/2013 |
| CN | 102938895 A | 2/2013 |
| CN | 103583072 A | 2/2014 |
| CN | 104144406 A | 11/2014 |
| CN | 104144528 A | 11/2014 |
| CN | 102892103 B | 10/2015 |
| CN | 105101164 A | 11/2015 |
| CN | 105744545 A | 7/2016 |

* cited by examiner

METHOD FOR PROCESSING RADIO FREQUENCY RESOURCES AND TERMINAL

CROSS-REFERENCE TO RELATED APPLICATIONS

This application is a U.S. National Stage of International Patent Application No. PCT/CN2017/104428 filed on Sep. 29, 2017, which is hereby incorporated by reference in its entirety.

TECHNICAL FIELD

This application relates to the field of mobile communications technologies, and specifically, to a method for processing radio frequency resources and a terminal.

BACKGROUND

With large-scale commercial use of a 4th Generation mobile communication technology (4th Generation mobile communication technology, 4G for short), a traffic fee decreases constantly. In an existing mobile terminal device, there are many real-time services, such as an online game service, a video service, and a lore broadcast service.

In a mobile network, stalling often occurs. The stalling severely affects the online game service, the video service, and the live broadcast service, Through analysis, in addition to stalling of a system, another reason for the stalling is that a terminal does not receive a downlink data packet in a timely manner or does not send an uplink data packet in a timely manner. This case is especially common for a multi subscriber identification module (Subscriber identification Module. SIM for short) card terminal. This type of terminal usually includes only a set of physical radio frequency (Radio Frequency. RF for short) resources and front end module (front end module, FEM for short) resources.

However, existing multi SIM card mobile terminals are mostly multi. SIM multi standby mobile terminals, for example, dual SIM dual standby (dual SIM dual standby, DSDS for short), and for another example, dual SIM dual active (dual SIM dual active, DSDA for short). In this case, when a primary card is used for the real-time services such as the online game service, the video service, d the live broadcast service, due to a need to support service requirements of the primary SIM card and a secondary SIM card simultaneously, relative to a single-card terminal, a problem of real-time service stalling of the primary SIM card is likely to occur.

SUMMARY

Embodiments of this application provide a method for processing radio frequency resources and a terminal. By reducing occupation of RF resources by a secondary SIM card in a real-time service, a problem of stalling of a primary SIM card because the secondary SIM card preempts the RE resources is resolved.

A first aspect the embodiments of this application provides a method for processing radio frequency RE resources. The method is used for a multi SIM multi standby terminal. In the method, a terminal first detects a service mode of a first service that uses a primary SIM card. The service mode may include two types, the first type is a real-time service, and the second type is a non-real-time service. The real-time service is a service that requires continuous information exchange, and the non-real-time service is a service that can perform information exchange at intervals. When finding that the first service is the real-time service, the terminal reduces a proportion of RF resources occupied by the secondary SIM card. In this case, the primary SIM card is a card for performing the real-time service, and the secondary SIM card is a card in the multi SIM multi standby terminal other than the primary SIM card.

It can be seen that in this application, the service mode of the first that uses the primary SIM card is determined. When the service mode of the current service of the primary SIM card is the real-time service, the proportion of the RE resources occupied by the secondary SIM card is adjusted. For the RE resources, whether the primary SIM card or the secondary SIM card performs a service, the RE resources are exclusively occupied. This proportion may be a proportion of duration in which the RF resources are occupied in other words, the proportion of the RF resources occupied by the secondary SIM card is reduced. Reducing the proportion includes reducing duration which the RF resources are occupied by the secondary SIM card in a rea ice phase, or reducing occupation duration of a service for which the secondary SIM card occupies the RF resources, or reducing frequency of a which the secondary SIM card uses the RF resources, so that a proportion of RF resources occupied by the primary SIM card is increased, relieving a problem of service staffing of the primary SIM card because the secondary SIM card preempts the RF resources.

With reference to the aspect in the embodiments of this application, in a first implementation of the first aspect in the embodiments of this application, a manner in which the terminal reduces the proportion of the RF resources occupied by the secondary SIM card other than the primary SIM card may be at least one of the following five manners. In a first manner, the terminal increases a preset out of (out of service, OOS for short) network search interval of the secondary SIM card. In other words, in an OOS state, the secondary SIM card searches for an available network at fixed intervals, and searching for the network needs to occupy RF resources. In this application, this interval is increased, to reduce the occupation of the RF resources by the secondary SIM card. In a second manner, the terminal reduces a preset OOS network search frequency hand of the secondary SIM card. In the OOS state, the network search frequency band of the secondary SIM card is not limited to a network to which the secondary SIM card belongs, and the secondary SIM card also searches for an entire frequency band. For example, a global system for mobile communications (global system for mobile communications, GSM for short), wideband code division multiple access (wideband code division multiple access, WCDMA for short), long term evolution (long term evolution, LIE for short), time division-synchronous code division multiple access (time division-synchronous code division multiple access, TDSCDMA for short) and code division multiple access (code division multiple access, CDMA for short) are all searched for. In this application, in the OOS state, the secondary SIM card only needs to search the network to which the secondary SIM card belongs, to reduce the occupation of the RF resources caused by the search. In a third manner, the terminal increases measurement duration of a preset inter-system measurement period of the secondary SIM card. The inter-system measurement is measuring another network standard under a current network standard. Due to different quantities of frequency channel numbers in different network standards, a time required for measurement is different, and a time taken for measurement is also different. For example, for the ITE, eight frequency channel numbers are required to be measured and each frequency channel number takes 220 ms. 1670 ins is required to complete a test of all the frequency channel numbers, occupying relatively long duration. Therefore, if the inter-system measurement period is increased, the occupation duration is greatly reduced on average, to achieve an objective of reducing occupation of the RF resources by the secondary SIM card. In a fourth manner, the terminal increases interval duration of intra-frequency measurement. The intra-frequency measurement is mainly to ensure quality of a current signal. Due to a feature that a mobile terminal nay be in movement, a signal strength is changed. To ensure the signal strength, detection may be performed in a specific period. In this application, it may be set that when a signal satisfies a specific strength, the period is increased, that is, an interval for detection is increased, to reduce the occupation of the RF resources by the secondary SIM card. In addition, power consumption can be reduced. Because a quantity of times of the detection is reduced, a case in which the primary SIM card needs to perform retransmission during a data transmission failure because the secondary SIM card occupies the RF resources can also be reduced. In a fifth manner, the terminal closes a background search of the secondary SIM card. There are two cases for a function of the background search. The one case is that if the current signal is a low priority 2G signal on the GSM, and if a high priority signal such as a 3G signal or even a 4G signal is found, 2G may be handed over to 4G. The other case is a roaming case, handing over from one operator network to another operator network may be a handover to a higher priority network or a network with better quality in this application, for the secondary SIM card, this function may be closed, to reduce the proportion of the RF resources occupied by the secondary SIM card.

In some embodiments, that the terminal reduces a preset OOS network search frequency band of the secondary SIM card may specifically be to perform a search for the network of the network standard to which the secondary SIM card belongs, and skip performing a roaming search, that is, skip searching for another network standard other than the network standard to which the secondary SIM card belongs. This manner can reduce an average duration value of the RF resources occupied by the terminal that searches for the network in the OOS state, to reduce the proportion of the RF resources occupied by the secondary SIM card.

In some embodiments, in the OOS state, the secondary SIM card skips searching for a high priority standard of the network standard to which the secondary SIM card belongs if the secondary SIM card is located in a low priority network standard of the network standard to which the secondary SIM card belongs. In other words, under the network standard, the terminal does not perform a switch from a low priority a high priority.

In some embodiments, that the terminal increases interval duration of intra-frequency measurement may specifically be that when a signal strength of the secondary SIM card is not less than a preset signal strength, the interval duration of the intra-frequency measurement on the secondary card is increased, that is, the interval duration may be set to a plurality of times an original interval, so that frequency of performing the intra-frequency measurement is reduced, to reduce the proportion of the RF resources occupied by the secondary SIM card.

In some embodiments, that the terminal closes a background search may include that the terminal closes a search for a network of another network standard other than the current network standard in which the secondary SIM card is located. To be specific, if the current network standard is a GSM, searches for any other network standards, for example, standards such as the LTE, the WCDMA and the TDSCDMA are not performed. Because the background search is searching every other period, closing the background search can also reduce the proportion of the RF resources occupied by the secondary SIM card.

In some embodiments, the terminal further detects a movement state of the terminal. The movement state includes a first state, where the first state is that a movement range of the terminal falls within a preset range. When the movement state of the terminal is the first state and the service mode of the first service is a real-time service mode, the terminal performs an operation of reducing the proportion of the RF resources occupied by the secondary SIM card. It can be seen that in this implementation, the movement state of the terminal is detected. When finding that the movement state falls within the preset movement range, it indicates that a user is likely to use a mobile terminal for an online game, a video, live broadcast, or the like. In this case, the embodiments of reducing the proportion of the RF resources occupied by the secondary SIM card in the first aspect may be performed.

In some embodiments, that the terminal detects a movement state of the terminal may be specifically that it is determined that the movement range of the terminal falls within the preset range when fluctuation duration of a signal of the terminal within a preset signal range exceeds first preset duration, and a cell ID of a serving cell on which the terminal camps does not change in the first preset duration in other words, when the cell does not change, and the signal strength of the terminal to exceed the first preset duration within the preset range; is determined that the movement range of the terminal falls within the preset range.

In some embodiments, a manner in which the terminal detects the service mode of the first service that uses the primary SIM card may be that an application name corresponding to the first service and an operating status of the first service is first obtained. The operating status includes foreground operating and background operating. It is determined that the first service is the real-time service when the operated first service is a preset application operated in the foreground.

In some embodiments, a manner in which the terminal detects the service mode of the first service that uses the primary SIM card may be alternatively that a data packet of the first service is first obtained, and then the data packet is analyzed. If the data packet can conform to a preset data packet model, it may also be determined that the first service is the real-time service.

A second aspect of this application provides a terminal, including a primary SIM card and at least one secondary SIM card, where the terminal may include:
   a first processing module, configured to detect a service mode of a first service that uses a primary SIM card, where the service mode includes a real-time service and a non-real-time service, and
   a second processing module, configured to reduce a proportion of RF resources occupied by the secondary SIM card when the service mode of the first service is a real-time service mode.

In some embodiments, the second processing module is specifically configured to perform at least one of the following:
   increase a preset out of service OOS network search interval of the secondary SIM card; reduce a preset OOS network search frequency band of the secondary SIM card;

increase measurement duration of a preset inter-system measurement period of the secondary SIM card; increase interval duration of intra-frequency measurement; and close a background search of the secondary SIM card.

In some embodiments, the second processing module is specifically configured to:

perform a search for a network of a network standard to which the secondary SIM card belongs, and skip performing a roaming search when the secondary SIM card is in an OOS state, where the roaming search is searching another network standard other than the network standard to which the secondary SIM card belongs.

In some embodiments, the second processing module is specifically configured to:

when the secondary SIM card is in the OOS state, skip searching for a high priority standard of the network standard to which the secondary SIM card belongs if the secondary SIM card is located in a low priority network standard of the network standard to which the secondary SIM card belongs.

In some embodiments, the second processing module is specifically configured to:

increase the interval duration of the intra-frequency measurement on the secondary SIM card when a signal strength of the secondary SIM card is not less than a preset signal strength.

In some embodiments the second processing module is specifically configured to:

close a search for a network of another network standard other than a current network standard in which the secondary SIM card is located.

In some embodiments, the terminal further includes:

a third processing module, configured to detect a movement state of the terminal, where the movement state includes a first state, and the first state is that a movement range of the terminal falls within a preset range; and the second processing module is further configured to reduce the proportion of the RF resources occupied by the secondary SIM card when the terminal is in the first state and the service mode of the first service is the real-time service mode.

In some embodiments, the third processing module is specifically configured to:

determine that the movement range of the terminal falls within the preset range when fluctuation duration of a signal of the within a preset signal range exceeds first preset duration, and a cell ID of a serving cell on which the terminal camps does not change in the first preset duration.

In some embodiments, the first processing module is specifically configured to:

obtain an application name corresponding to the first service and an operating status of the first service, where the operating status includes foreground operating and background operating; and determine that the first service is the real-time service when the first service is a preset application operated in the foreground.

In some embodiments, processing specifically configured to:

obtain a data packet of the first service; and determine that the first service real-time se when the data packet conforms to a preset data packet model.

A third aspect of the embodiments of this application further vides a terminal, including a primary SIM card and at least one secondary SIM card, where the terminal includes:

an application processor, configured to detect a service mode of a first service that uses a primary SIM card, where the service mode includes a real-time service and a non-real-time service; and a communications processor, configured to reduce a proportion of RF resources occupied by the secondary SIM card when the service mode of the first service is a real-time service mode.

In some embodiments, the communications processor is specifically configured to perform at least one of the following:

increase a preset out of service OOS network search interval of the secondary SIM card; reduce a preset OOS network search frequency band of the secondary SIM card; increase measurement duration of a preset inter-system measurement period of the secondary SIM card; increase interval duration of intra-frequency measurement; and close a background search of the secondary SIM card.

In some embodiments, the communications processor Is specifically configured to:

perform a search for a network of a network standard to which the secondary SIM card belongs, and skip performing a roaming search when the secondary SIM card is in an OOS state, where the roaming search is searching another network standard other than the network standard to which the secondary SIM card belongs.

In some embodiments, the communications processor is specifically configured to:

when the secondary SIM card is in the OOS state, skip searching for a high priority standard of the network standard to which the secondary SIM card belongs if the secondary SIM card is located in a low priority network standard of the network standard to which the secondary SIM card belongs.

In some embodiments, the communications processor is specifically configured to:

increase the interval duration of the intra-frequency measurement secondary SIM card when a signal strength of the secondary SIM card is not less than a preset signal strength.

In some embodiments, the communications processor is specifically configured close a search for a network of another network standard other than a current network standard in which the secondary SIM card is located.

In some embodiments, the terminal further includes:

a co-processor, configure to detect a movement state of the terminal, where the movement state includes a first state, and the first state is that a movement range of the terminal falls within a preset range; and the communications processor is further configured to reduce the proportion of the RF resources occupied by the secondary SIM card when the terminal is in tyre first state and the service mode of the first service is the real-time service mode.

In some embodiments, co processor is specifically configured to:

determine that the movement range of the terminal falls within the preset range when fluctuation duration of a signal of the terminal within a preset signal range exceeds first preset duration, and a cell ID of a serving cell on which the terminal camps does not change in the first preset duration.

In some embodiments, the application processor is specifically configured to:

obtain an application name corresponding to the first service and an operating status of the first service, where the operating status includes foreground operating and background operating; and determine that the first service is the real-time service when the first service is a preset application operated in the foreground.

In some embodiments, the application processor is specifically configured to:

obtain a data packet of the first service; and determine that the first service is the real-time service when the data packet conforms to a preset data packet model.

Another aspect of this application provides a computer-readable storage medium. The storage medium stores computer code, and when the computer code is run by a terminal, the computer is enabled to perform the method in the foregoing aspects. The storage medium includes but is not limited to a flash memory (flash memory), a hard disk drive (hard disk drive, HDD for short), or a solid state drive (solid state drive, SSD for short).

Another aspect of this application provides a computer program product including an instruction, and when the instruction is run on a computer, the computer is enabled to perform the method in the foregoing aspects.

DESCRIPTION OF EMBODIMENTS

Embodiments of this application provide a method for processing radio frequency resources and a terminal. By reducing occupation of RF resources by a secondary SIM card in a real-time service, a problem of stalling of a primary SIM card because the secondary SIM card preempts the RF resources is resolved.

To make persons skilled in the art understand the technical solutions in this application better, the following describes the embodiments of this application with reference to the accompanying drawings in the embodiments of this application.

In the specification, claims, and accompanying drawings of this application, the terms "first", "second", "third", "fourth", and so on (if exist) are intended to distinguish similar objects but do not necessarily describe a specific order or sequence. It should be understood that the data termed in such a way are interchangeable in proper circumstances so that the embodiments described herein can be implemented in other orders than the order illustrated or described herein, in addition, the terms "include", "have" and any other variants mean to cover the non-exclusive: inclusion, for example, a process, method, system, product, or device that includes a list of steps or units is not necessarily limited to those steps or units, but may include other steps or units not expressly listed or inherent to such a process, method, product, or device.

Figure 1:
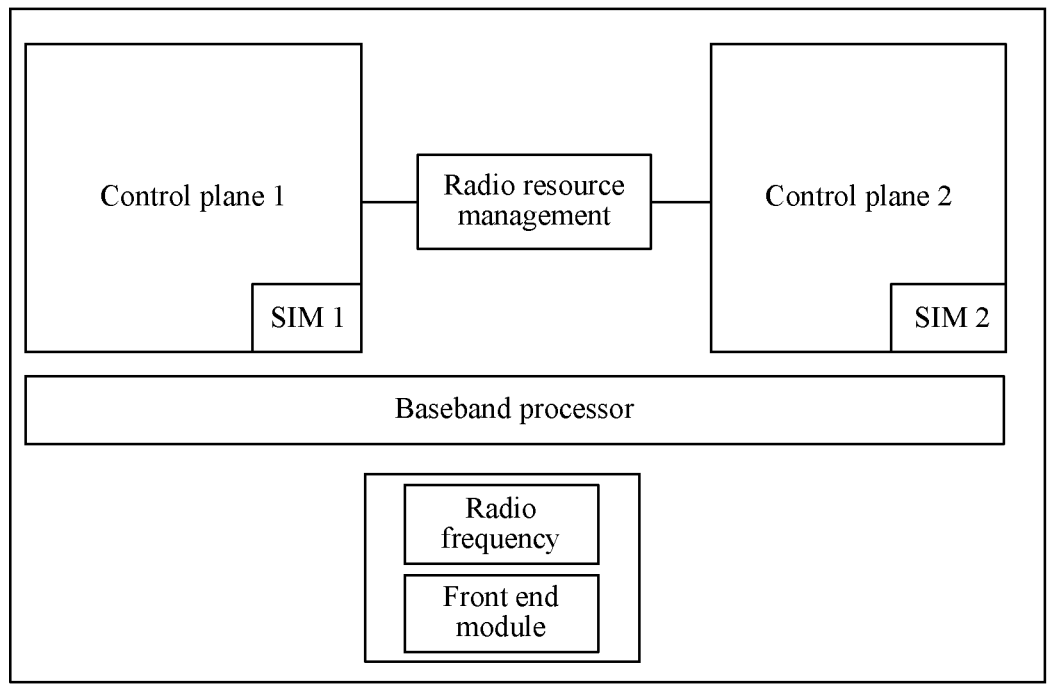
FIG. 1 is a schematic architectural diagram of a dual SIM dual standby mobile device.

A multi SIM multi standby terminal uses a set of RF resources and FEM resources in a same terminal. By performing time division multiplexing on the resources, a plurality of cards can be on standby simultaneously. For example, referring to FIG. 1, FIG. 1 is a schematic architectural diagram of a dual SIM dual standby mobile device. There are only a set of RF resources and FEM resources in the architecture, A communications processor (communication processor, CP for short) includes a baseband processor (baseband processor, BBP for short) and content of control planes of a SIM card 1 and a SIM card 2 that are in FIG. 1. The CP is responsible for a communications mechanism of a mobile terminal. Both the SIM 1 and the SIM 2 have corresponding control planes, the SIM 1 is corresponding to a plane 1 and the SIM 2 is corresponding to a control plane 2. Coordinated by the CP, the SIM 1 and the SIM 2 share the set of RF resources, to be specific, radio resource management (radio resource management, RRM for short) manages and supports, for example, a radio resource control (radio resource control, RRC for short) protocol and a gateway access service (gateway access service, GAS for short).

It can be seen that because the mobile terminal has only the set of RF and FEM resources, to support multicard or multi/node, the multicard or the multimode shares radio frequency resources in a time division multiplexing mode, thereby achieving a dual standby objective. However, during time division multiplexing, task preemption may occur, so that data transmission may be intermittent. Moreover, as a secondary SIM card is changed from supporting only a 2-Generation wireless telephone technology (2-Generation wireless telephone technology, 2G for short) to supporting 3G (3rd Generation mobile communication technology, 3G for short) and 4G, an interoperation in an inter-system needs to be performed. However, this operation also occupies RF resources. Moreover, the world is in a 2G network exit process, Network coverage of 2G continues to deteriorate, so that a search for 2G also occupies resources.

Figure 2:
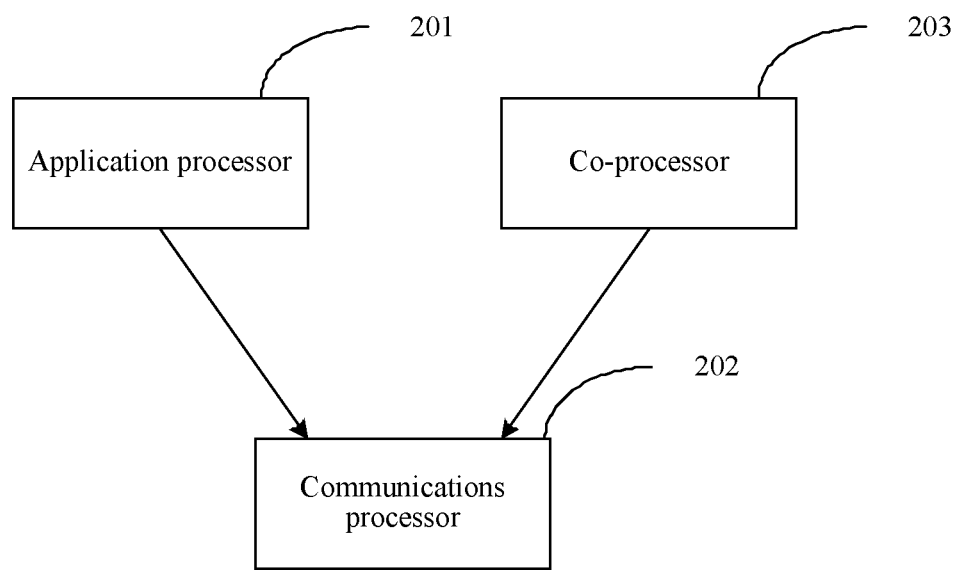
FIG. 2 is a schematic architectural diagram of a terminal according to an embodiment of this application.

Based on the foregoing problem, the embodiments of this app provide a method for processing radio frequency resources and a terminal to resolve the foregoing problem. Specifically, referring to FIG. 2, FIG. 2 is a schematic architectural diagram of a terminal according to an embodiment of this application. A terminal 2 includes an application processor 201, a communications processor 202 and a co-processor 203, The application processor is configured to determine whether a current operated service is a real-time service. For example, a particular online game is operated, and needs to be connected to a network in real time, and when the online game is operated in the foreground, the application processor determines that the service is the real-time service. The communications processor 202 receives a result that the current operated service is the real-time service and that is provided by the application processor 201, and then the communications processor 202 may adjust a proportion of RF resources occupied by a secondary SIM card. The co-processor 203 is configured to manage a plurality of sensors in a mobile terminal. In the embodiments of this application, the co-processor 203 is mainly configured to manage a motion sensor. The co-processor can determine a current movement state of the terminal based on movement data obtained by the motion sensor. The movement state is a movement range of the terminal. For example, in this application, a preset range may be set to 2 meters, and the mobile terminal is a mobile phone or a tablet computer. When finding that the mobile phone or the tablet computer moves only within 2 meters, the co-processor determines that the terminal is in a small-range movement state, that is, a micro movement state. In this case, the co-processor may determine that a user may use the mobile phone or the tablet computer in a relatively fixed place, and further determine a real-time service scenario according to an application program operated in the foreground, so that the determining for the real-time service is more accurate. Certainly, in this embodiment, there are a plurality of movement states in a movement range beyond 2 meters, for example, other case such as in-vehicle, bicycling, jogging, running, and stationary states that do not belong to the micro movement state. After completing the determining, the co-processor 203 also sends a determining result to the communications processor 202. The communications processor 202 integrates data of the application processor 201 and the co-processor 203 to complete adjustment of the RF resources of the secondary SIM card.

It should be noted that, if the communications processor 202 can determine whether data packets sent and received by using the RF resources conform to a preset data packet model, the communications processor 202 can determine whether the current operated service is the real-time service. Because the real-time service needs to exchange data packets in real time, relative to an intermittent exchange manner, the data packets exchanged in real have features of the data packets, so that the communications processor 2132 may determine, based on these features, whether the real-time service is operated.

Figure 3:
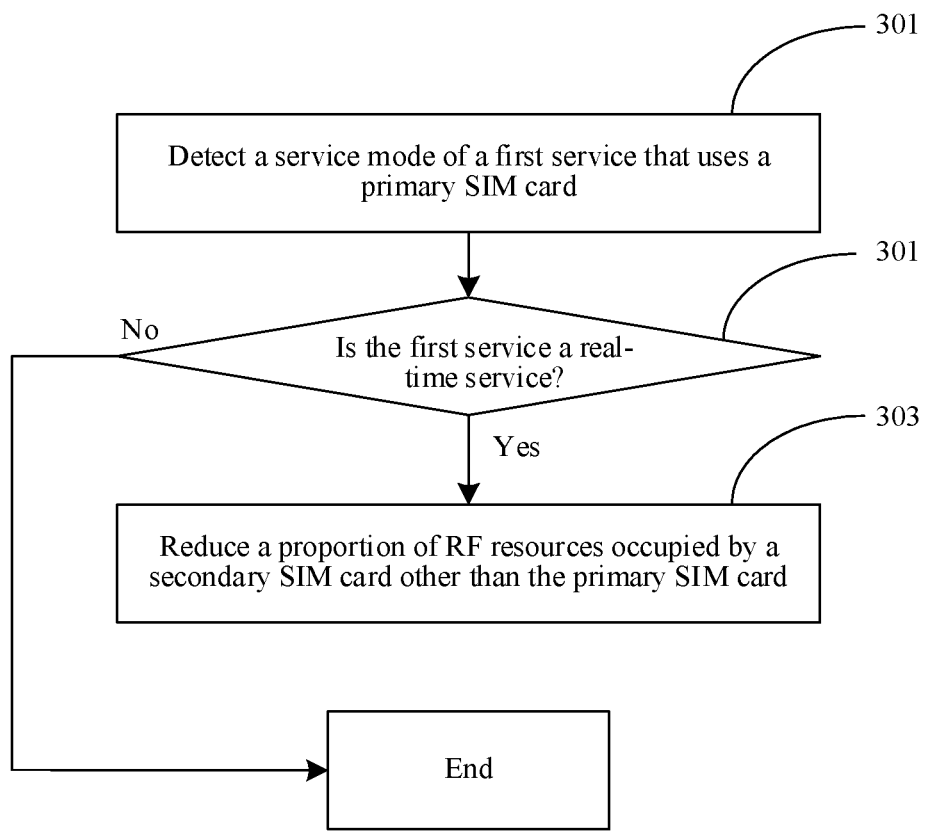
FIG. 3 is an embodiment diagram of a method for processing RF resources according to an embodiment of this application.

A terminal architecture in an embodiment of this application is described above, and a specific processing procedure of a method for processing radio frequency resources in an embodiment of this application is described below, Referring to FIG. 3, FIG. 3 is an embodiment diagram of a method for processing radio frequency resources according to an embodiment of this application. The method may include:

301, A terminal detects a service mode of a first service drat uses a primary SIM card.

The service ode includes a real-time service and a non-real-time service. The real-time service is a service that requires continuous data packet exchange. Once there is an interruption, stalling may be caused, or even a current application is directly closed. There are a plurality of real-time services, for example, an online came, a video chat, and live broadcast. These services all need real-time transmission of a data packet, and in a process of maintaining the service, a large quantity of data packets are required to be transmitted to ensure service quality of the service. The non-real-time service is a service that does not require continuous data packet exchange, and the data packet is only transmitted when exchange is required. For example, in a social communications service, when text, pictures and voice and received, more data packets are required to be transmitted only in a short time period of sending and receiving, and less information is intermittently trans d to verify an online situation of a user in a remaining time.

It should be noted that in this embodiment of this application, there are a plurality of manners to detect the service mode of the first service, which are separately described in the following.

First, the terminal detects a service status of the first service through an application name corresponding to the first service and an operating status of the first service.

Specifically, the application name corresponding e first service is first obtained, in an Android system, the application name may be a package name of an Android package (Android package, APK for short field in the package name can reflect a specific name of this application. By determining the specific name of the application and comparing the specific name with a preset application name list, it can be learned whether the current application is a real-tune application. The preset application name list stores application names of real-time services, and application names of non-real-time services. Therefore, it is determined that the current operated first service is the real-time service.

Second, the terminal detects the service status of the first service by analyzing a data packet of the first service.

Specifically, the terminal may first obtain the data packet of the first service, regardless of an uplink data packet or a downlink data packet, and then determine a format of the data packet. If the format of the data packet conforms to a preset data packet model, the terminal may determine that the first service is the real-time service. Data packets generated in an operating process of different real-time services are counted and analyzed, and the preset data packet model is a data packet model generated based on features of these data packets. Therefore, provided that a format of a data packet of a particular service conforms to the data packet model, it may be determined that the service is the real-time service.

Third, by setting independent operating space in a system, it may be agreed that an application started from the operating space is the real-time service.

Specifically, in actual usage, some real-time applications may be added to the operating space, and the application is started from the operating space. In this case, the terminal may determine that a service corresponding to the application is the real-time service.

302. Determine whether the first service is a real-time service, if the first service is the real-time service, step 303 is performed, and if the first service is not the real-time service, the procedure jumps to an end.

303, Reduce a proportion of RF resources occupied by a secondary card other than the primary SIM card.

When it is determined that the current first service is the real-time service, the proportion of the RF resources occupied by the secondary SIM other than the primary SIM card is reduced. There is a need to ensure that the secondary SIM card is in a standby state, and the standby state is state ready for communication. For example, an SMS message and a phone call can be received. To ensure the standby state, the secondary SIM card needs to preempt a unique set of RF resources and FEM resources in the terminal at times. The occupation proportion may be reduced from two aspects, the first aspect is reducing frequency that the secondary SIM card uses the RE resources, and the second aspect is reducing duration in which the secondary SIM card occupies the RF resources in an operation such as a network search process.

It should be noted that, in this application, the proportion of the RE resources occupied by the secondary SIM card or the primary SIM card is a proportion from a time dimension. For example, in a time period M, the duration in which the secondary SIM card occupies the RF resources is totally N, and duration in which the primary SIM card occupies the RF resources is totally P, so that the proportion of the RF resources occupied by the secondary SIM card is N/M, and correspondingly, the proportion of the RF resources occupied by the primary SIM card is WM.

Figure 4:
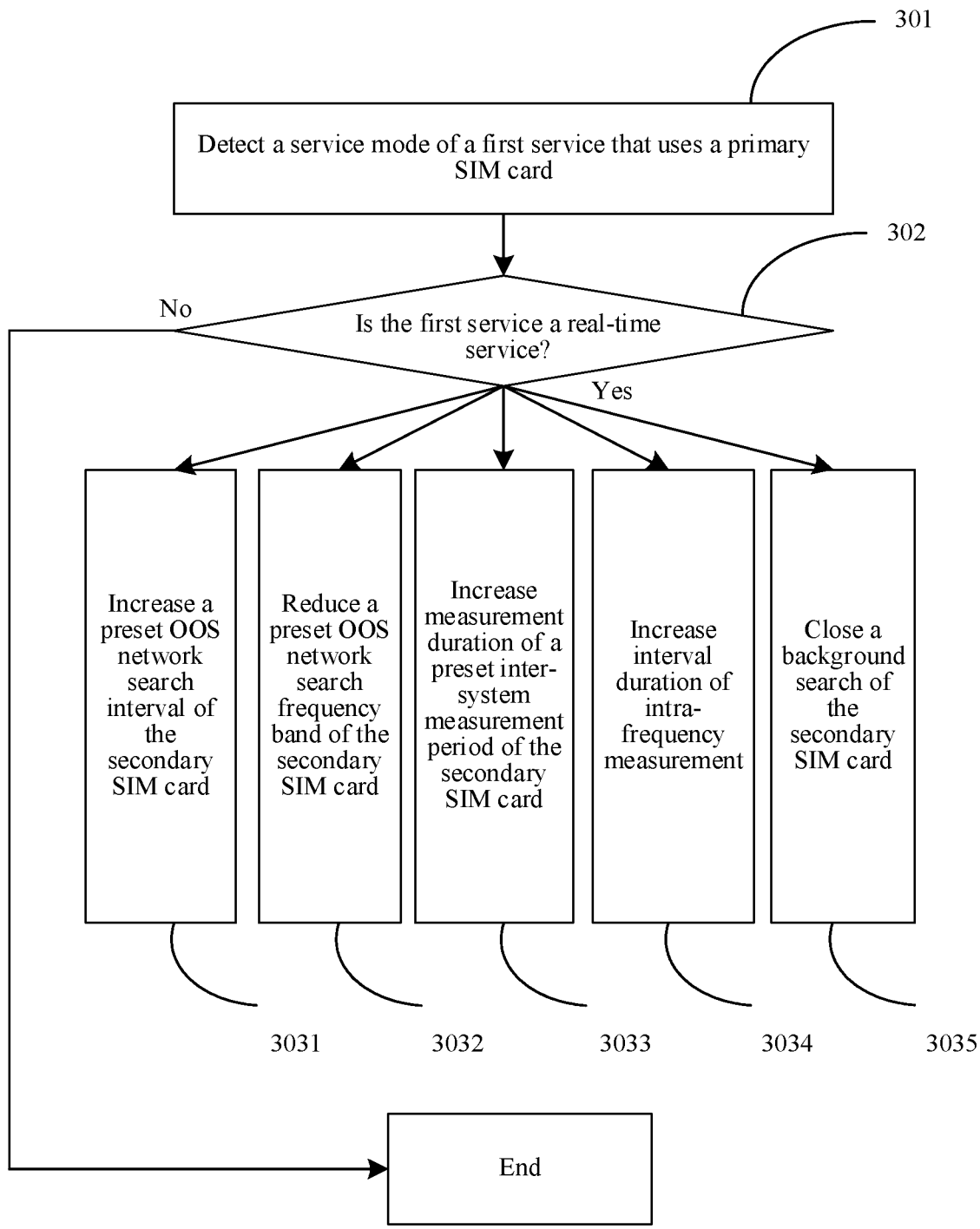
FIG. 4 is an embodiment diagram of a method for processing RF resources according to an embodiment of this application.

It should be noted that, a plurality of manners of reducing proportion of the RE resources occupied by the secondary SIM card are provided in an embodiment of this application and are separately described below. Referring to FIG. 4. FIG. 4 is an embodiment diagram of a method for processing RF resources according to an embodiment of this application. Step 303 may include at least one of the following steps.

3031. The terminal increases a preset OOS network search interval of the secondary card.

To be specific, in an OOS state, the secondary SIM card may search for an available network at fixed intervals. However, searching for the network needs to occupy RF resources. In this embodiment of this application, the interval is increased, to reduce occupation of the RF resources by the secondary SIM card. For example, in the OOS state, the terminal performs one network search every in a preset state. The preset interval may be adjusted to a plurality of times the interval. For example, one network search is performed at an adjusted interval of 180 s. 180 s is only a default setting value in this embodiment application, and an actual interval may be set voluntarily. Details are not described herein again. The preset state is that if the OOS state occurs, the terminal p one network search every 10 s in a factory default case.

3032, The terminal reduces a preset OOS network search frequency hand of the secondary SIM card.

In the OOS state, the network search frequency band of the secondary SIM card is not limited only to a network to which the secondary SIM card belongs. The network to which the secondary SIM card belongs is a network provided by a network operator corresponding to the secondary SIM card. Currently, an operator may provide networks from 2G to 4G. Different network standards from 2G to 4G are selected due to differences between network standards. For example, a GSM is selected as a 2G network, WCDMA is selected as a 3G network, and LIE is selected as a 4G network. For another example, a GSM is selected as a 2G network, TDSCDMA is selected as a 3G network and LTE is selected as a 4G network. Although the GSM may be 2G networks of both of two different operators, frequency hands of the 2G networks of the two different operators may be different, Therefore, in the OOS state, the secondary SIM card searches for an entire frequency hand. For example, the secondary SIM card searches for the GSM, the WCDMA, the LTE, the TDSCDMA and the CDMA, In this application, in the OOS state, the secondary SIM card searches only for the network to which the secondary SIM card belongs, that is, searches only for the GSM, the WCDMA and the LTE, searches only for the GSM, the TDSCDMA and the LIE, or the like, Because the network search frequency band is reduced, occupation of the RF resources caused by the search can be reduced. Certainly, in actual usage, even reducing a search for one frequency band can correspondingly reduce a part of the proportion of the RF resources occupied by the secondary SIM card, and reducing searches for a plurality of frequency bands may cause a smaller proportion of the RF resources occupied by the secondary SIM card.

Optionally, in a manner 2, a specific process may be that the search for the network of a network standard to which the secondary SIM card belongs is performed, and a roaming search is not performed, that is, a search for another network standard other than the network standard to which the secondary SIM card belongs is not performed. A roaming technology is that a card belonging to an operator may be registered to a network of another operator for use when a network of the operator has a poor signal at a particular location, Because this technology needs a switch to the another operator, costs are usually relatively high. This manner can reduce an average duration value of the RF resources occupied by the terminal that searches for the network in the OOS state, to reduce the proportion of the RF resources occupied by the secondary SIM card.

Optionally, in the OOS state, the secondary SIM card skips searching for a high priority standard of the network standard to which the secondary SIM card belongs if the secondary SIM card is located in a low priority network standard of the network standard to which the secondary SIM card belongs. In other words, under the network standard, the terminal does not perform a switch from a low priority to a high priority. Specifically, if the operator to which the secondary SIM card belongs provides the GSM as the 2G network, the WCDMA as the 3G network and the LIE as the 4G network, and the network standard to which the secondary SIM card belongs before the OOS is the GSM, even there are WCDMA and LTE signals, the WCDMA network standard and the LTE network standard are not be reselected. Therefore, measurement may be not performed on another signal ether than a GSM signal.

3033. The terminal increases measurement duration of a preset inter-system measurement period of the secondary SIM card.

The inter-system measurement is measuring another network standard under a current network standard, Due to different quantities of frequency channel numbers in different network standards, a time required for measurement is different, and a time taken for measurement is also different. For example, the current network standard is a GSM standard, and the LIE is required to be measured. Because the LTE is configured with eight frequency channel numbers, and each frequency channel number takes ms during measurement. 1670 ms is required to complete a test of all the frequency channel numbers, occupying relatively long duration. Therefore, if the inter-system measurement period is increased, the occupation duration is greatly reduced on average, to achieve an objective of reducing occupation of the RF resources by the secondary SIM card. In addition, frequency channel number measurement is implemented by consuming specific power. Therefore, if the period is doubled, power consumption may be reduced by half correspondingly. In this embodiment of this application, under a default setting, the period is three times a conventional inter-system measurement period without affecting the service of the secondary SIM card. Specifically, this multiple value may be adjusted based on actual needs. This is not limited herein.

3034. The terminal increase interval duration of intra-frequency measurement.

The intra-frequency measurement means that to ensure quality of a current signal even though the terminal s in a particular network standard, a signal strength may be periodically measured. Specifically, due to a feature that a mobile terminal may be in movement, the signal strength is changed. To ensure the signal strength, detection may be performed in a specific period. When it is found that the signal strength is greatly reduced, a corresponding operation such as a cell handover may be performed to cause the signal strength to reach a required signal strength. However, during the cell handover, the network standard may also need to be changed.

Option in this application, at when the signal satisfies a specific strength, an intra-frequency measurement period is increased, that is, a detection interval is increased, to reduce the occupation of the RF resources by the secondary SIM card. In this embodiment of this application, by default, the intra-frequency measurement period is set to three times an origin period. In an actual case, this multiple may be set voluntarily, Details are not described herein again. In addition, increasing the intra-frequency measurement period can further reduce power consumption. Moreover, because a quantity of times of the detection is reduced in the same duration, a case in which the primary SIM card needs to perform retransmission during a data transmission failure because the secondary SIM card occupies the RF resources can also be reduced.

3035. The terminal closes a background search of the secondary card.

There are two cases for a function of the background search. The one case is that if the current signal is a to v priority 2G signal on the GSM, and if a high priority signal such as a 3G signal or even a 4G signal is found, 2G may be handed over to 4G. The other case is a roaming case, handing over from one operator network to another operator network may be a handover to a higher priority network or a network with better quality in this application, for the secondary SIM card, this function may be closed, to reduce the proportion of the RF resources occupied by the secondary SIM card.

Optionally, that the terminal closes a background search may inch de that the terminal closes a search for a network of the another network standard other than the current network standard in which the secondary SIM card is located. To be specific, if the secondary SIM card is currently located in the GSM network standard, searches for any other network standards, for example, standards such as the LIE, the WCDMA and the TDSCDMA are not performed. Because the background search is searching every other period, closing the background search can also reduce the proportion of the RF resources occupied by the secondary SIM card.

It should be noted that the foregoing five manners may be used in any combination, that is, any one of the foregoing five manners may be used, or two, three, four or even five of the manners may be used in combination.

It can be seen that in this application, the service mode of the first service that uses the primary SIM card is determined. When the service mode of the current service of the primary SIM card is the real-time service, the proportion of the RF resources occupied by the secondary SIM card is adjusted. For the RF resources, whether the primary SIM card or the secondary SIM card performs a service, the RF resources are exclusively occupied. This proportion may be a proportion of duration in which the RF resources are occupied in other words, the proportion of the RF resources occupied by the secondary SIM card is reduced. Reducing the proportion includes reducing duration which the RF resources are occupied by the secondary SIM card in a rea ice phase, or reducing occupation duration of a service for which the secondary SI card occupies the RF resources, or reducing frequency of a which the secondary SIM card uses the RF resources, so that a proportion of RF resources occupied by the primary SIM card is increased, relieving a problem of service staffing of the primary SIM card because the secondary SIM card preempts the RF resources.

It should be noted that this embodiment of this application, in a scenario in which the terminal performs the real-time service, there is further a subdivided type of scenario, that is, a case in which the terminal moves in a small range. For example, in a real-time service scenario in which a user plays an online game or performs network live broadcast, the user may play the online game or perform the network live broadcast when sitting sofa, lying on a bed or sitting at a desk, and has a relatively small movement range. For the secondary SIM card, because a terminal location hardly changes, the signal strength of the secondary SIM card tends to be stable, and the current network in which the secondary SIM card is located does not change, so that in the scenario, even though at least one of step 3031 to step 3035 is performed on the secondary SIM card, the service of the secondary SIM card is not affected.

In this embodiment of this application, for determining the foregoing subdivided scenario, whether there is the foregoing subdivided scenario is determined in a manner in which a co-processor is added to detect the movement state of the terminal. Two manners of detecting the movement state of the terminal are provided in the following, and are respectively described.

First, a movement range of the terminal is detected through a motion sensor.

The terminal first detects the movement state of the terminal. The movement state includes a first state, and the first state is that the movement range of the terminal falls within a preset range. In this embodiment of this application, movement within the preset range is defined as a micro movement state, and the micro movement state conforms to usage habits when the user currently performs an online game service, a live broadcast service d a video chat service. The movement range of the terminal is actually a movement range in a particular preset time period, for example, within 5 minutes or 10 minutes. Certainly, the duration may be set voluntarily. Details are not described herein again. Then, if the movement state of the terminal is the first state and the service mode of the first service is a real-time service mode, the terminal performs at least one of step 3031 to step 3035 to reduce the proportion of the RF resources occupied by the secondary SIM card.

It should be noted that, the co-processor is a processor that is developed and applied to assist a central processing unit (for example, an application processor in the terminal) to complete a processing task that cannot be performed or that is performed inefficiently and with a poor effect by the central processing unit. For the terminal, especially a mobile terminal, there is a higher requirement for a standby time. Some processing tasks in the terminal are performed by using the central processing unit, causing higher power consumption, and a processing chip with lower power consumption can be actually used to successfully perform the processing tasks. For example, provided that a system of the terminal is operated, some sensors such as a gravity sensor, a gyroscope and a light sensor in the terminal need to constantly collect and analyze data. However, provided that the central processing unit is in an operating: status, power consumption is relatively high, so that for this type of processing tasks, the co-processor may be independently set to assist the central processing unit. For example, for screen unlock, currently fingerprint unlock is usually used. When fingerprint authentication succeeds, a screen is lightened and the system is entered. To implement this function, a fingerprint sensor needs to be always in an operating state, so that a response can be quickly generated. Currently, the co-processor is used to manage the fingerprint sensor. Provided that the co-processor initially determines that the data collected by the fingerprint sensor is fingerprint data, the co-processor wakes the central processing unit to further perform fingerprint comparative analysis and complete an unlock operation.

It can be seen that the movement state of the terminal is detected by using the motion sensor. When finding that the movement state falls within the preset movement range and the first service is the real-time service, it indicates that the user may use the mobile terminal for the online game, the video or the live broadcast. In this case, the embodiments of reducing the occupation duration of the RF resources by the secondary SIM card in step 303 may be performed.

Optionally, that the terminal detects the movement state of the terminal may further be obtained by measuring a signal. Specifically, it is determined that the movement range of the terminal falls within the preset range when fluctuation duration of the signal of the terminal within a preset signal range exceeds first preset duration, and a cell ID of a serving cell on which the terminal camps does not change in the first preset duration. For example, if the cell that the terminal currently accesses is a cell A, that is, provided that the terminal always accesses the cell, if continuous fluctuation of the signal strength maintains to exceed Y within an X db range, it is determined that the movement range of the terminal falls within the preset range. For X and Y by default, X may be set to 6, Y may be set to 10, and a unit is s. Certainly, X and Y may be adjusted based on an actual required effect. Details are not described herein again.

Figure 5:
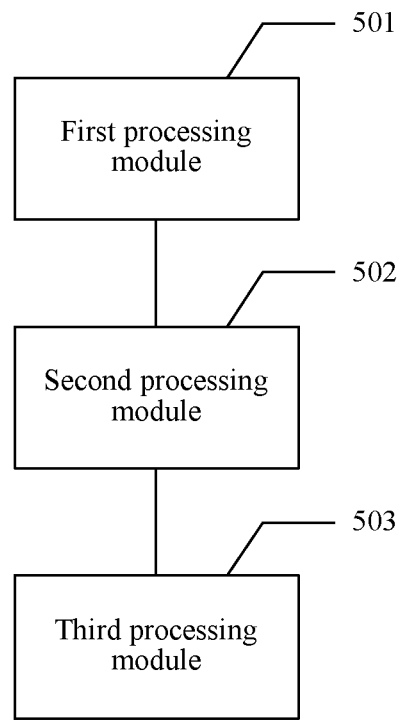
FIG. 5 is an embodiment diagram of a terminal according to an embodiment of this application.

A method for processing RF resources in an embodiment of this application is described above, and a terminal in an embodiment this application is described below, Referring to FIG. 5, FIG. 5 is an embodiment di am of a terminal according to an embodiment of this application. The terminal may include:

a first processing module 501, configured to detect a service mode of a first service that uses a primary SIM card, where the service mode includes a real-time service and a non-real-time service; and a second processing module 502, configured to reduce a proportion of RF resources occupied by the secondary SIM card when the service mode of the first service is a real-time service mode.

Optionally the second processing module 502 is specifically configured to perform at least one of the following:

increase a preset out of service OOS network search interval of the secondary SIM card; reduce a preset OOS network search frequency band of the secondary SIM card; increase measurement duration of a preset inter-system measurement period of the secondary SIM card; increase interval duration of intra-frequency measurement; and close a background search of the secondary SIM card.

Optionally, the second processing module 502 is specifically configured to;

perform a search for a network of a network standard to which the secondary SIM card belongs, and skip performing roaming search when the secondary SIM card is in an OOS state, where the roaming search is searching another network standard other than the network standard to which the secondary SIM card belongs.

Optionally, the second processing module 502 is specifically configured to:

when the secondary SIM card is in the OOS state, skip searching for a high priority standard of the network standard to which the secondary SIM card belongs if the secondary SIM card is located in a low priority network standard of the network standard to which the secondary SIM card belongs.

Optionally, the second processing module 502 is specifically configured to:

increase the interval duration of the intra-frequency measurement on the secondary SIM card when a signal strength of the secondary SIM card is not less than a preset signal strength.

Optionally, the second processing nodule 502 is specifically configured to:

close a search for a network of another network standard other than a current network standard in which the secondary SIM card is located.

Optionally, the terminal further includes:

a third processing module 503, configured to detect a movement state of the terminal, where the movement state includes a first state, and the first state is that a movement range of the terminal falls within a preset range; and the second processing module 502 is further configured to reduce the proportion of the RE resources occupied by the secondary SIM card when the terminal is in the first state and the service mode of the first service is the real-time service mode.

Optionally the third processing module 503 is specifically configured to:

determine that the movement range of the terminal falls within the preset range when fluctuation duration of a signal of the terminal within a preset signal range exceeds first preset duration, and a cell ID of a serving cell on which the terminal camps does not change in the first preset duration.

Optionally, the first processing module 501 is specifically configured to:

obtain an application name corresponding to the first service d an operating status of the first service, where the operating status includes foreground operating and background operating; and determine that the first service is the real-time service when the first sere ice is a preset application operated in the foreground.

Optionally, the first processing module 501 is specifically configured to:

obtain a data packet of the first service; and determine that the first service is the real-time service when the data packet conforms to a preset data packet model.

Figure 6:
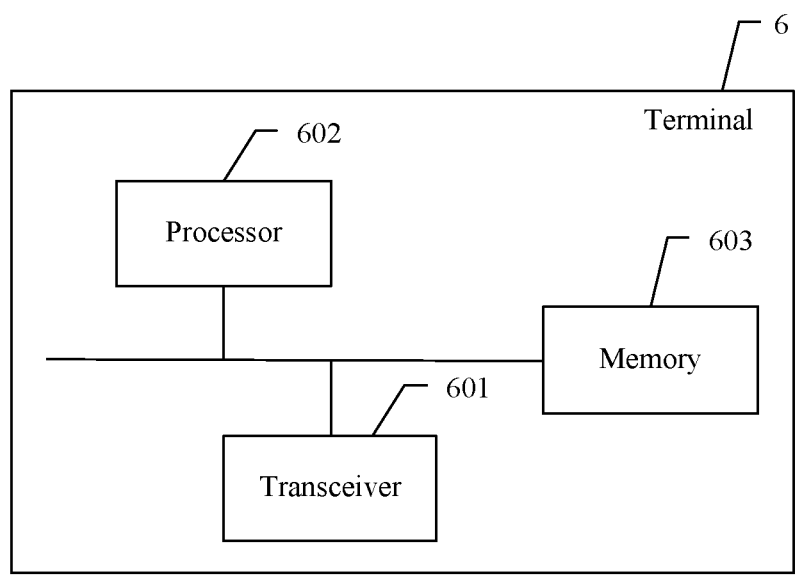
FIG. 6 is an embodiment diagram of a terminal according to an embodiment of this application.

A terminal in an embodiment of this application is described above, and a structure of the terminal in an embodiment of this application is described below. Referring to FIG. 6, FIG. 6 is an embodiment diagram of a terminal according to an embodiment of this application. A terminal 6 may include at least one processor 602, at least one transceiver 601, and a memory 603 that are connected. The terminal related to this embodiment of this application may have more or fewer components than those shown in FIG. 6, may combine two or more components, or may have different component configuration or setting. Each component may be implemented in hardware, software, or a combination or of hardware and software that includes one or more signal processing circuits and/or one or more application-specific integrated circuits.

Specifically, for the embodiment show the at least one processor 602 can implement functions of the first processing module 501, the second processing module 502 and the third processing module 503 of the terminal in the embodiment shown in FIG. 5, The transceiver 601 can implement a transceiver function of the terminal in the embodiment shown in FIG. 5, The memory 603 is configured to store a program instruction, and the method for processing RF resources in the embodiment shown in FIG. 3 or FIG. 4 is implemented by executing the program instruction.

All or some of the embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), the like.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units nay or may not be physical units, may be located in one position, or may be distributed on a plurality of network units. Some or all of the units may be selected based on actual requirements to achieve the objectives of the solutions of the embodiments.

In addition, functional units in the embodiments of dais application may be integrated into one processing unit, each of the units may exist alone physically; or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

In conclusion, the foregoing embodiments are merely intended for describing the technical solutions of this application, but not for limiting this application. Although this application is described in detail with reference to the foregoing embodiments, persons skilled in the art should understand that they may still make modifications to the technical solutions described in the foregoing embodiments or make equivalent replacements to some technical features thereof, without departing from the technical solutions and scope of the embodiments of this application.

What is claimed is:

1. A method for processing radio frequency (RF) resources implemented by a multi-subscriber identification module (SIM) multi-standby terminal, the method comprising:
    detecting a service mode of a first service that uses a primary SIM card, wherein the service mode comprises a real-time service mode and a non-real-time service mode, and wherein the primary SIM card is configured for performing the real-time service mode;
    performing at least one of the following steps when the service mode is the real-time service mode:
        increasing a preset out-of-service (OOS) network search interval of a secondary SIM card, wherein the secondary SIM card is a SIM card other than the primary SIM card in the multi-SIM multi-standby terminal;
        reducing a preset OOS network search frequency band of the secondary SIM card;
        increasing a measurement duration of a preset intersystem measurement period of the secondary SIM card;
        increasing an interval duration of intra-frequency measurement; or
        terminating a background search of the secondary SIM card;
    performing a search for a network of a first network standard to which the secondary SIM card belongs; and
    skipping performing a roaming search when the secondary SIM card is in an OOS state, wherein the roaming search comprises searching for a second network standard other than the first network standard.

2. The method of claim 1, further comprising:
    identifying that the secondary SIM card is in the OOS state; and
    skipping searching for, in response to the identifying, a high priority standard of the first network standard when the secondary SIM card is located in a low priority network standard of the first network standard.

3. The method of claim 1, further comprising
    identifying that a signal strength of the secondary SIM card is greater than or equal to a preset signal strength; and
    increasing, in response to the identifying, the interval duration of the intra-frequency measurement on the secondary SIM card.

4. The method of claim 1, further comprising closing a search for a network of a second network standard other than a current network standard in which the secondary SIM card is located.

5. The method of claim 1, further comprising:
detecting a movement state of the multi-SIM multi-standby terminal, wherein the movement state comprises a first state, and wherein a movement range of the multi-SIM multi-standby terminal falls within a preset range in the first state; and
reducing a proportion of the RF resources occupied by the secondary SIM card when the multi-SIM multi-standby terminal is in the first state and the service mode is the real-time service mode.

6. The method of claim 5, further comprising:
identifying that a fluctuation duration of a signal of the multi-SIM multi-standby terminal within a preset signal range exceeds a first preset duration and a cell identifier (ID) of a serving cell on which the multi-SIM multi-standby terminal camps does not change in the first preset duration; and
determining, in response to the identifying, that the movement range of the multi-SIM multi-standby terminal falls within the preset range.

7. The method of claim 1, further comprising:
obtaining an application name corresponding to the first service and an operating status of the first service, wherein the operating status comprises foreground operating and background operating; and
determining that the first service is the real-time service mode when the first service operated by the multi-SIM multi-standby terminal is a preset application in the foreground operating.

8. The method of claim 1, further comprising:
obtaining a data packet of the first service; and
determining that the first service is the real-time service mode when the data packet conforms to a preset data packet model.

9. A terminal, comprising:
a primary subscriber identification module (SIM) card configured to perform a real-time service mode;
a secondary SIM card;
an application processor coupled to the primary SIM card and the secondary SIM card and configured to detect a service mode of a first service that uses the primary SIM card, wherein the service mode comprises the real-time service mode and a non-real-time service mode; and
a communications processor coupled to the primary SIM card, the secondary SIM card, and the application processor and configured to perform at least one of the following when the service mode is the real-time service mode:
increase a preset out of service (OOS) network search interval of the secondary SIM card;
reduce a preset OOS network search frequency band of the secondary SIM card;
increase a measurement duration of a preset inter-system measurement period of the secondary SIM card;
increase an interval duration of intra-frequency measurement; or
terminate a background search of the secondary SIM card;
perform a search for a network of a first network standard to which the secondary SIM card belongs; and
skip performing a roaming search when the secondary SIM card is in an OOS state, wherein the roaming search comprises searching a second network standard other than the first network standard.

10. The terminal of claim 9, wherein the communications processor is further configured to:
identify that the secondary SIM card is in the OOS state; and
skip searching for, in response to the identifying, a high priority standard of the first network standard when the secondary SIM card is located in a low priority network standard of the first network standard.

11. The terminal of claim 9, wherein the communications processor is further configured to:
identify that a signal strength of the secondary SIM card is greater than or equal to a preset signal strength; and
increase, in response to the identifying, the interval duration of the intra-frequency measurement on the secondary SIM card.

12. The terminal of claim 9, wherein the communications processor is further configured to terminate a search for a network of a second network standard other than a current network standard in which the secondary SIM card is located.

13. The terminal of claim 9, further comprising a co-processor coupled to the communications processor and configured to detect a movement state of the terminal, wherein the movement state comprises a first state, wherein a movement range of the terminal falls within a preset range in the first state, and wherein the communications processor is further configured to reduce a proportion of RF resources occupied by the secondary SIM card when the terminal is in the first state and the service mode is the real-time service mode.

14. The terminal of claim 13, wherein the co-processor is further configured to:
identify that a fluctuation duration of a signal of the terminal within a preset signal range exceeds a first preset duration and a cell identifier (ID) of a serving cell on which the terminal camps does not change in the first preset duration; and
determine, in response to the identifying, that the movement range of the terminal falls within the preset range.

15. The terminal of claim 9, wherein the application processor is further configured to:
obtain an application name corresponding to the first service and an operating status of the first service, wherein the operating status comprises foreground operating and background operating; and
determine that the first service is the real-time service mode when the first service is a preset application in the foreground operating.

16. The terminal of claim 9, wherein the application processor is further configured to:
obtain a data packet of the first service; and
determine that the first service is the real-time service mode when the data packet conforms to a preset data packet model.

17. A computer program product comprising computer-executable instructions for storage on a non-transitory computer-readable medium that, when executed by a processor, cause a multi-subscriber identification module (SIM) multi-standby terminal to:
detect a service mode of a first service that uses a primary SIM card, wherein the service mode comprises a real-time service mode and a non-real-time service mode, and wherein the primary SIM card is for performing the real-time service mode;
perform at least one of the following steps when the service mode of the first service is the real-time service mode:

increase a preset out of service (OOS) network search interval of a secondary SIM card, wherein the secondary SIM card is in the multi-SIM multi-standby terminal other than the primary SIM card;

reduce a preset OOS network search frequency band of the secondary SIM card;

increase a measurement duration of a preset inter-system measurement period of the secondary SIM card;

increase an interval duration of intra-frequency measurement; or terminate a background search of the secondary SIM card;

identify that a signal strength of the secondary SIM card is greater than or equal to a preset signal strength; and increase, in response to the identifying, the interval duration of the intra-frequency measurement on the secondary SIM card.

18. The computer program product of claim 17, wherein the computer-executable instructions further cause the multi-SIM multi-standby terminal to detect a movement state of the terminal, wherein the movement state comprises a first state, wherein a movement range of the terminal falls within a preset range in the first state, and to reduce a proportion of RF resources occupied by the secondary SIM card when the terminal is in the first state and the service mode is the real-time service mode.

19. The computer program product of claim 18, wherein the computer-executable instructions further cause the multi-SIM multi-standby terminal to:

identify that a fluctuation duration of a signal of the terminal within a preset signal range exceeds a first preset duration and a cell identifier (ID) of a serving cell on which the terminal camps does not change in the first preset duration; and determine, in response to the identifying, that the movement range of the terminal falls within the preset range.

20. The computer program product of claim 17, wherein the computer-executable instructions further cause the multi-SIM multi-standby terminal to terminate a search for a network of a second network standard other than a current network standard in which the secondary SIM card is located.

* * * * *